(12) United States Patent
Du et al.

(10) Patent No.: US 8,359,303 B2
(45) Date of Patent: Jan. 22, 2013

(54) METHOD AND APPARATUS TO PROVIDE MULTIMEDIA SERVICE USING TIME-BASED MARKUP LANGUAGE

(76) Inventors: Xiaosong Du, Morganville, NJ (US);
Yanlin Guan, Santa Clara, CA (US);
Xiang Li, Milpitas, CA (US)

(*) Notice: Subject to any disclaimer, the term of this patent is extended or adjusted under 35 U.S.C. 154(b) by 644 days.

(21) Appl. No.: 12/329,409

(22) Filed: Dec. 5, 2008

(65) Prior Publication Data

US 2009/0150369 A1  Jun. 11, 2009

Related U.S. Application Data

(60) Provisional application No. 61/005,554, filed on Dec. 6, 2007.

(51) Int. Cl.
*G06F 17/30* (2006.01)
*G06F 3/00* (2006.01)

(52) U.S. Cl. .................. 707/706; 715/719
(58) Field of Classification Search ............ 707/706, 707/913, E17.056; 715/719, 205, 760
See application file for complete search history.

(56) References Cited

U.S. PATENT DOCUMENTS

| | | | |
|---|---|---|---|
| 6,006,241 A * | 12/1999 | Purnaveja et al. | 715/205 |
| 2002/0036694 A1 * | 3/2002 | Merril | 348/220 |
| 2004/0205830 A1 * | 10/2004 | Kaneko | 725/135 |
| 2006/0174021 A1 * | 8/2006 | Osborne et al. | 709/230 |
| 2007/0112837 A1 * | 5/2007 | Houh et al. | 707/102 |
| 2007/0208861 A1 * | 9/2007 | Zellner et al. | 709/227 |
| 2007/0294641 A1 * | 12/2007 | Rashkovskiy | 715/838 |
| 2008/0268876 A1 * | 10/2008 | Gelfand et al. | 455/457 |
| 2008/0306925 A1 * | 12/2008 | Campbell et al. | 707/4 |
| 2009/0112832 A1 * | 4/2009 | Kandogan et al. | 707/4 |

* cited by examiner

*Primary Examiner* — Amresh Singh
(74) *Attorney, Agent, or Firm* — Howard H. Sheerin (57) ABSTRACT

A multimedia player and method is disclosed for displaying multimedia content on a video screen. A video stream and a markup language segment associated with the video stream are received, wherein the markup language segment comprising a time stamp identifying a target segment of the video stream, and at least one keyword associated with the time stamp. The keyword is transmitted over a network to a search engine, and related content is received from the search engine over the network, wherein the related content is related to the keyword. When the target segment of the video stream is displayed on the video screen, the related content is concurrently displayed on the video screen.

51 Claims, 9 Drawing Sheets

```
<M2L>
    <icon_display content_url="http://www.mycontent.com/news_icon.jpg"/>        ←——401
    <small_display content_url="http://www.mycontent.com/news_small.mp4"/>     ←——402
    <large_display content_url="http://www.mycontent.com/news_large.mp4"/>     ←——403
    <click_report url="http://www.advertise_manager.com?content_id=123"/>      ←——404
    <next_m2l url="http://www.m2lserver.com/next.m2l"/>          ←——405
    <time_object>    ←——406
        <start_time_stamp time="1200ms"/>   ←——407
        <stop_time_stamp time="2400ms"/>    ←——408
        <content_info keyword="top stories"/>   ←——409
        <content_info keyword="IBM get a new CEO john smith"/>   ←——410
        <action url="http://www.m2lserver.com/search_news?IBM"/>   ←——411
        <action url="http://www.m2lserver.com/search_people?john+smith"/>   ←——412
        <action url="user_prefer"/>    ←——413
    </time_object>
    <time_object>
        <start_time_stamp time="2800ms"/>   ←——414
        <stop_time_stamp time="3700ms"/>    ←——415
        <content_info keyword="business news"/>   ←——416
        <content_info keyword="Google stock reaches $1000"/>   ←——417
        <action url="http://www.m2lserver.com/search_news?Google"/>   ←——418
        <action url="http://www.m2lserver.com/search_stock?Google"/>   ←——419
        <action url="user_prefer"/>    ←——420
    </time_object>
</M2L>
```

FIG. 4

```
<user_prefer>
    <content>   ←——— 501
        <content_match name="news top stories" match="60%"/>   ←——— 502
        <content_match name="finance business stock" match="any"/>   ←——— 503
        <server url="http://www.finance_server.com"/>   ←——— 504
        <parameter name="user_id" value="smith_john"/>   ←——— 505
        <parameter name="stock_profile" value="smith_john_stock"/>   ←——— 506
    </content>
    <.user_prefer url="http://www.content_sever.com?user_id=smith_john"/>   ←——— 507
    <default>   ←——— 508
        <server url="http://www.general_search.com"/>   ←——— 509
        <parameter name="user_id" value="smith_john"/>   ←——— 510
    </default>
    </content>
</user_prefer>
```

METHOD AND APPARATUS TO PROVIDE MULTIMEDIA SERVICE USING TIME-BASED MARKUP LANGUAGE

BACKGROUND

Description of the Related Art

The most popular markup language nowadays is HTML, which is the corner stone for today's Internet applications. HTML not only presents information, but also presents the links between information which may not directly reside it, and in many cases, the linked information resides in different part of the network. With the help of a web browser, we can not only surfer through the HTML itself, but also surfer into the linked information.

In the early days of the Internet, HTML mainly contains text and limited still images. Today, HTML contains text, images, video, audio, animation and other useful information. With the popularity of Youtube, iTune, Second Life, 3D online games and other applications, more and more multimedia content, such as video, audio, animation, 3D games will be available on the Internet. A new emerging technology is IP TV, which offers content-enriched multimedia service through IP-based network. Meanwhile, traditional cable and satellite TV industries are working very hard to advance their technologies and upgrade their infrastructures to offer more competitive multimedia services.

The core of content-enriched multimedia service is to present video and audio stream, combined with data, animation and other information. If we examine most of today's websites, the user experience can be described as what we called a "click-download-view" behavior. That is the user click a link, the web browser downloads some content which can be a piece of text, video or audio, and the web browser presents to the user. The user watches it and finds what he is interested, then does a "click-download-view" again. If we take a look at today's TV industry, even the latest IP TV, it becomes even worse compared to web browsing. Although the user can choose from over hundred channels, and easily switch between, after the user press the button, the program starts and the user can do little about it. The user either keeps watching or switches to a different channel. Thanks the help from TiVO, the user can do time-shifting display now, but nothing more. If we carefully examine the video, audio centric multimedia content, we will realize that its subject or information concentration is changing by time. For example, when we are watching the TV news, the subject is changing from headlines to business, then to weather, then to sports, etc. As the time passes by, the subject is changing. Even for a movie, the scenes and focus is constantly changing. The presentation of today's video, audio centric multimedia content is mainly in a download-play mode. The player does not aware at certain time of the presentation what content it plays; therefore the player can not offer extra multimedia information related to the content it presents. Under this circumstance, the player does nothing more but dummy playing. To offer user preference service becomes impossible.

One major challenge for multimedia presentation is how to offer personalized service or targeted service. For example, when we watch business news, it normally reports Dow, NASDAQ, and S&P 500, besides this, one user may be interested in stock price of Intel and Microsoft, the other user may be interested in stock price of Google and Yahoo. It will be great to present stock information of Intel and Microsoft along with the normal business news on one user's screen and present stock information of Google and Yahoo along with the normal business news on the other user's screen. A more advance capability besides the personalized service is to dynamically grab and present multimedia information using a search engine.

Other important issues in multimedia presentation are how to effectively protect copyright; how to effectively monitor the advertisement and offer targeted advertise meanwhile protecting the user's privacy; last but not least, how to make a payment or how to bill a user during the multimedia presentation.

In 1995, NEC demonstrated a system using HyperVideo. HyperVideo is the name for video augmented with hyperlinks. The system has the capability to present video meanwhile let user click and go to a hyperlink. Jeane Chen et al of IBM filed a patent (U.S. Pat. No. 6,175,840 B1) in 1997. In this patent, it described a method to indicate the hot links inside a video. However, none of the above work addressed the complex problems that we presented.

In these respects, the method and apparatus to provide multimedia service using time-based markup language according to the present invention substantially departs from the conventional concepts and designs of the prior art, and in so doing provides a method, an apparatus primarily developed for the purpose of visually exploring content-enriched multimedia information and offering user preference services.

SUMMARY OF EMBODIMENTS OF THE INVENTION

The present invention provides a method, an apparatus, a computer program, and a system, which offer multimedia service using time-based markup language. The time-based markup language is called "Multimedia Markup Language" or in brief M2L. The time-based markup language defines the multimedia content and a list of time-based objects. Each time-based object contains three kinds of information: the valid time period, the text hints and the actions. The time-based object provides the text-based information of the presenting multimedia content in a given period of time and the proper actions can be taken related to this content in this given period of time.

The method, an apparatus, a computer program and a system of the present invention comprises a time-based markup language player, which consists of a multimedia content loader, a multimedia markup language loader, a multimedia content engine, a multimedia markup language engine, a multimedia content render and a user input processor. The time-based markup language player has connections to cable/satellite, local storage and Internet and can load multimedia content and time-based markup language files through these connections. The time-based markup language player loads and interprets the time-based markup language file and presents the multimedia content defined inside the time-based markup language file. During presentation of multimedia content, the time-based object gives the player text hints regarding the presenting multimedia content at curtain period of time and it also tells the player what proper actions it should take. These actions can be either requests to the time-based markup language server or user-preferred actions.

The method, an apparatus, a computer program and a system of the present invention comprises a time-based markup language server which accepts requests from the time-based markup language player, analyzes the requests, forms a new time-based markup language file which contains a new series of multimedia content and sends back to the time-based markup language player to play.

The method, an apparatus, a computer program and a system of the present invention comprises a user preference markup language which contains user defined, text-based content keywords and the user preferred actions related to these keywords. For the user-preferred action defined in the time-based object, the time-based markup language player will try to match the text-based hints with the user defined keywords. If the player finds a match, the related actions will be taken. These related actions can be requests to the user preferred time-based markup language server.

The method, an apparatus, a computer program and a system of the present invention comprises a user preferred time-based markup language server. This server allows the user to register and define his preference actions for given set of information. This server accepts requests from the time-based markup language player containing the user information, analyzes the requests, forms a new time-based markup language file which contains a new series of multimedia content according to the user defined preference and sends back to the time-based markup language player to play.

DETAILED DESCRIPTION OF EMBODIMENTS OF THE INVENTION

A method, an apparatus, a computer program, and a system for providing multimedia service using time-based markup language are disclosed in this invention. In the following description, the details of network infrastructure, system architecture, and implementation are disclosed. It will be apparent to one skilled in the art, however, that the present invention may be practiced without these specific details. In other instances, well-known features are not described in detail so as not to obscure the present invention. The present invention will be more completely understood through the following detailed description which should be read in conjunction with the attached drawings.

The embodiments of the invention use two markup languages to achieve user-preferred multimedia presentation. The first markup language is called Multimedia Markup Language (M2L). The Multimedia Markup Language defines what multimedia content will be played. Meanwhile, it defines a group of time objects which give text-based hints regarding the multimedia content at certain period of time. The second markup language is called user preferred mark language, which defines the user preferred action for given content.

The embodiments of the invention use Multimedia Language Player (M2L Player) to play the multimedia content defines in the M2L meanwhile use the text-based hints defined in the time object of the M2L to math the user preferred markup language content information field. If the player finds a match, it will take action according to the user preferred markup language defined action.

Figure 1:
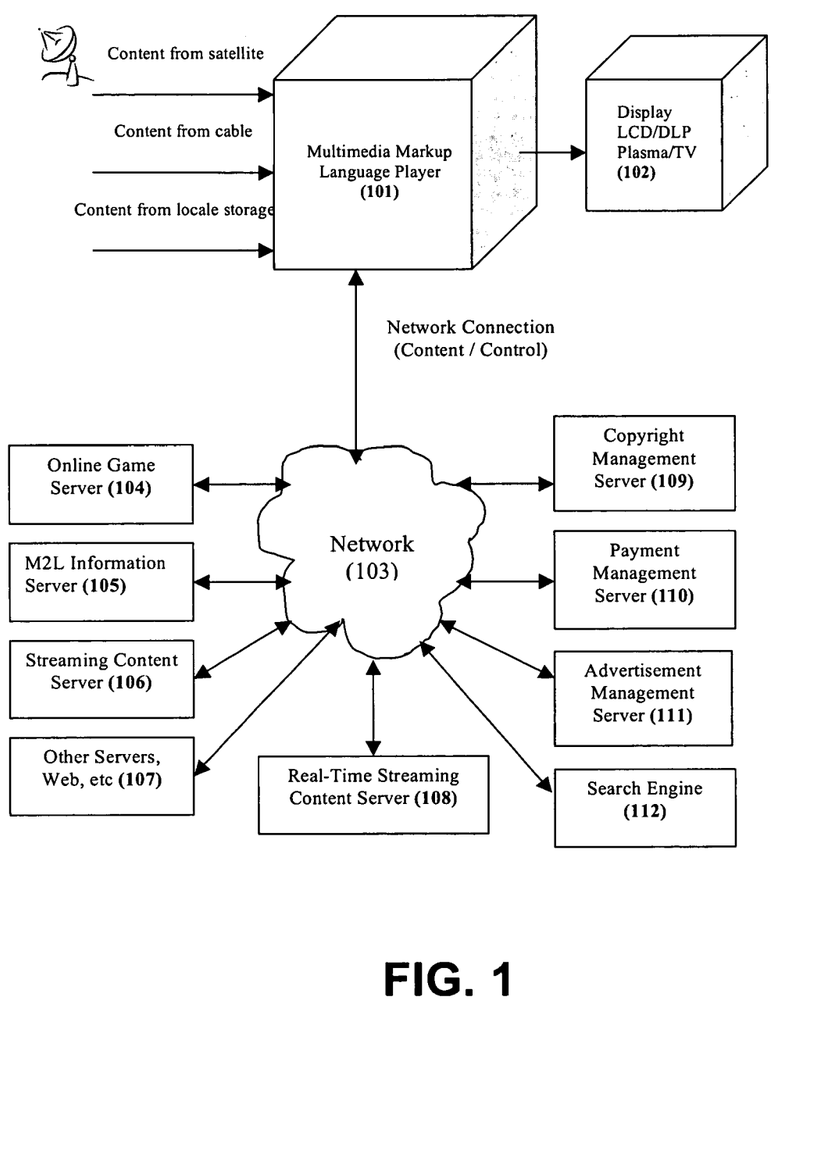
FIG. 1 is a view of network connection of Multimedia Markup Language Player.

FIG. 1 is a view of network connection of Multimedia Markup Language Player. The center is the Multimedia Markup Language Player (101). It can load multimedia content, the multimedia markup language file and user preferred markup language file from satellite, cable, locale storage (such as DVD, hard drive, etc) and network. The Multimedia Markup Language Player connects to various kinds of service providers through network. In FIG. 1, the Multimedia connects to M2L information server (105), streaming content server (106), real-time streaming content server (108), online game server (104), search engine (112), copyright management server (109), payment management server (110), advertisement management server (111) and other servers (such as web server, etc) (107). The M2L player loads and parses a M2L file from M2L information server (105) then starts to load multimedia content from different service provider servers. For example, if the multimedia content is live TV, it will load and play the content from satellite or cable. If the multimedia content is a DVD, it will load and play from local storage. If the multimedia content is online video clips, it will load and play from Streaming Content Server (106). If the multimedia content is live traffic video, it will load and play from Real-Time Streaming Server (108). The M2L file also enables other important services such as copyright enforcement, directly purchasing and advertisement management. If these features are enabled, the M2L player will talk to the Copyright Management Server (109), Payment Management Server (110) and Advertisement Management Server (111). The output of M2L Player will be sent to Display device (102), such as LCP/DLP/Plasma TV.

Figure 2:
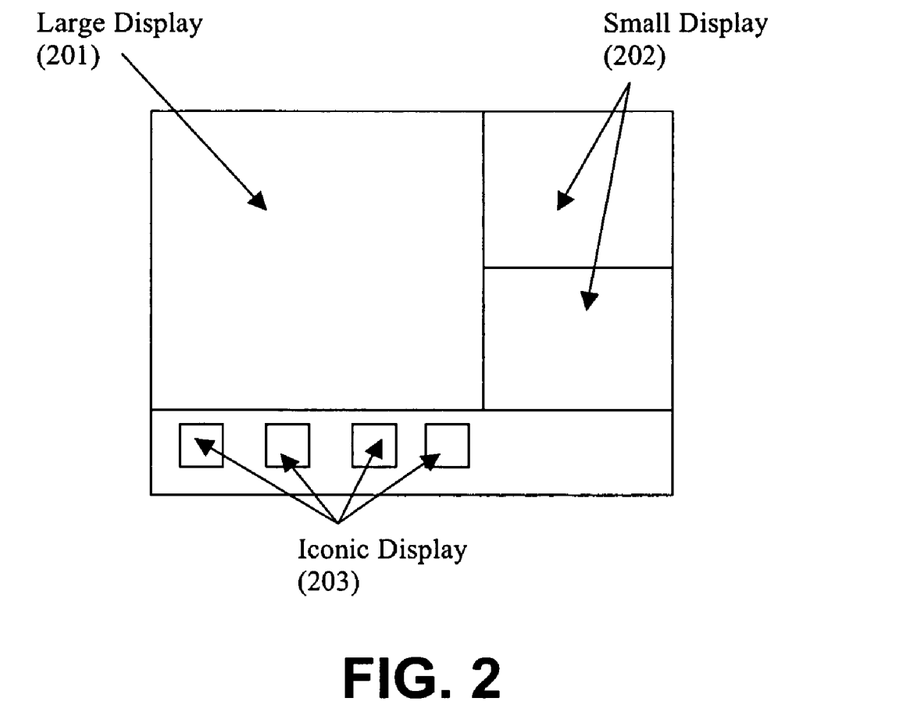
FIG. 2 is an example of Multimedia Markup Language Player screen layout.

FIG. 2 shows an example of the screen layout for Multimedia Markup Language Player. There are three kinds of display modes for given multimedia content, namely "Large Display" mode, "Small Display" mode and "Iconic Display" mode. In "Large Display" mode, the content is displayed in full size (FIG. 2 201) with full audio volume. In "Small Display" mode, the content is displayed in half or quarter size (FIG. 2 202) without audio or audio with lower volume and mixed with the "Large Display" audio. In "Iconic Display" mode, the content is displayed as an "Icon" (FIG. 2 203) and no audio is played. In general, the master M2L's content is displayed in "Large Display" mode, and the content presented in its "time-object" will be displayed in "Small Display" mode or in "Iconic Display" mode. The user can browse through and switch around and choose which one he is interested to play. FIG. 2 illustrates one example of screen layout. Here we just give an example. There can be almost infinite flavor of layouts can be used. Which one to use depends on user preference and the capability of the player.

Figure 3:
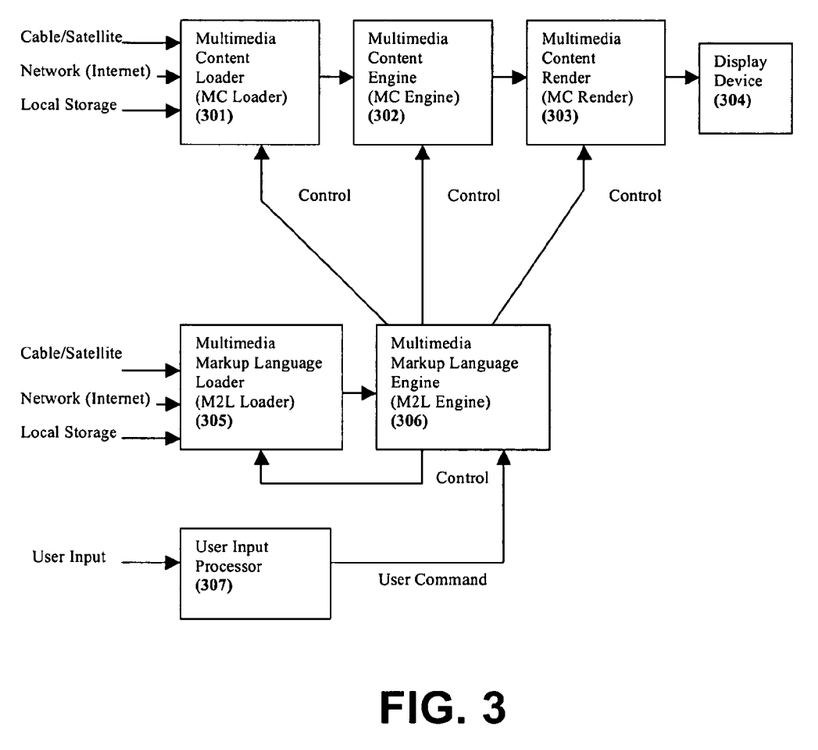
FIG. 3 is the block diagram of Multimedia Markup Language Player which shows all the major components.

FIG. 3 gives a block diagram of Multimedia Markup Language Player (M2L Player). It consists of Multimedia Content Loader (301), Multimedia Content Engine (302), Multimedia Content Render (303), Display Device (304), Multimedia Markup Language Loader (305), Multimedia Markup Language Engine (306) and User Input Processor (307). The Multimedia Markup Language Loader (305) loads a M2L file and a user preferred markup language file from cable/satellite connection, network or local storage. It passes the M2L file to Multimedia Markup Language Engine (M2L Engine 306). The M2L Engine will parse the M2L file and generate time object list. Meanwhile, it will inform the Multimedia Content Loader (301) to load the proper multimedia content and this content will send to Multimedia Content Engine (MC Engine 302) to decode and format. Then the MC Engine sends the decoded, well formatted content to Multimedia Content Render (MC Render 303) to render onto the Display Device (304). The M2L Engine will check with MC Engine and monitor the progress of multimedia content playing. When the multimedia content progress meets the time object requirements, the M2L Engine will process the time object actions, which may generate a new set of sub-M2L to load and play. The user can interact with the Multimedia Markup Language Player using a remote control, keyboard or mouse. The user input will pass into M2L Engine to take proper action.

Figure 4:
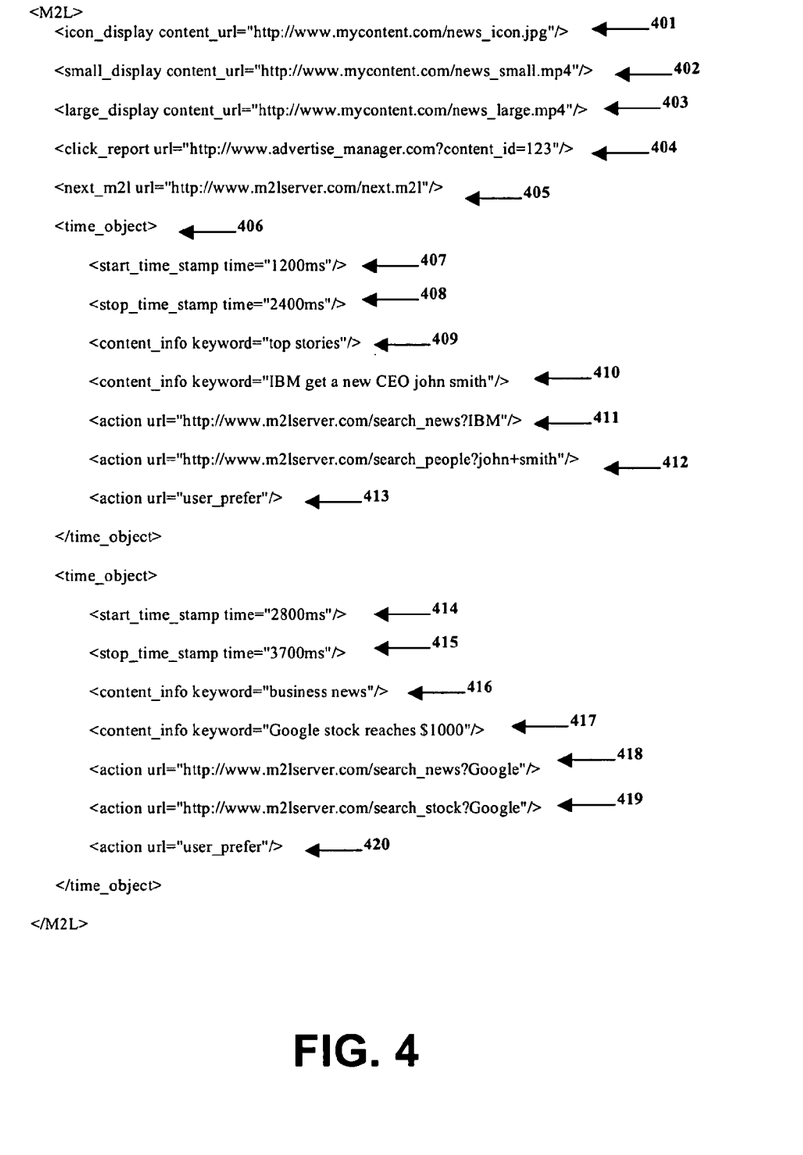
FIG. 4 is an example Multimedia Markup Language (M2L) file.

FIG. 4 gives a multimedia markup language (M2L) example. Line 401 indicates that if the M2L is in iconic display mode, the M2L player should load and display the content indicated by the "content_url" parameter. In this example, it is a JPEG file called "news_icon.jpg" and can be loaded from "www.mycontent.com". Line 402 indicates that if the M2L is in small display mode, the M2L player should load and display the content indicated by the "content_url" parameter. In this example, it is a mp4 file called "news_small.mp4" and can be loaded from "www.mycontent.com". Line 403 indicates that if the M2L is in large display mode, the M2L player should load and display the content indicated by the "content_url" parameter. In this example, it is a mp4 file called "news_large.mp4" and can be loaded from "www.mycontent.com". Line 401, 402 and 403 tell the M2L player which content it should play under different display mode and where to load these contents. The M2L player has the capability to report to a given sever with certain information. Line 404 gives an example that the M2L player can inform the advertisement manage server with the information about what content is played so that it can properly charge the advertiser. This feature can also be used in copyright enforcement and other applications. Line 405 tells the M2L player after playing the current M2L's content, what is the next M2L it should play. With this feature, the M2L files can be linked together and played continuously. This is a very important feature required by TV or IPTV applications where a non-stop continuously playing is mandatory. Line 406 defines the beginning of a "time_object". The "time_object" is the most important concept for the M2L. It gives the M2L player text-based hint regarding the multimedia content. This text-based hint is time sensitive. Line 407 indicates that the given "time_object" is valid after the content is played for 1200 milliseconds. Line 408 indicated that the given "time_object" is invalid after the content is played for 2400 milliseconds. Line 409 indicates the text-based hint, which is "top stories". Line 410 gives another text-based hint, which is "IBM get a new CEO john smith". The "time_object" defines not only the text-based hits but also defines what kinds of actions that M2L player should take within the valid time of the given "time_object". Line 411 gives an action example. The M2L player goes to "www.m2lserver.com" and calls "search_news" service with keyword "IBM". The remote server searches the news regarding "IBM" and returns a new M2L file to the M2L player. Inside this new M2L file, it contains more multimedia content regarding "IBM". The M2L player will add a new iconic display and tell the user that there is some related content that he can play. If the user selects the new icon, the M2L player starts to play the multimedia contents inside the new M2L file in small or large display mode. Another very important feature of M2L is that it can invoke user preferred action. Line 413 defines the last action for the given "time_object" is to do "user_prefer" actions. The M2L player will use the text-based hints to match the content keywords inside "user_prefer" file. If the M2L player finds a match, it will contact the user preferred server with the keyword and other information. The user preferred server processes the information and sends back a new M2L file. The M2L player will add a new iconic display and tell the user that his preferred information is coming. If the user selects the new icon, the M2L player starts to play the multimedia contents inside the user preferred M2L file. Line 412 gives another action example. The "time_object" is valid between 2800 milliseconds and 3700 milliseconds (Line 414 and Line 415). The text-based hints are "business news" and "Google stock reaches $1000" (Line 416 and Line 417). Two predefined actions are to search news and stock information regarding Google (Line 418 and Line 419). The user preferred action also needs to be invoked for this "time_object" (Line 420).

Figure 5:
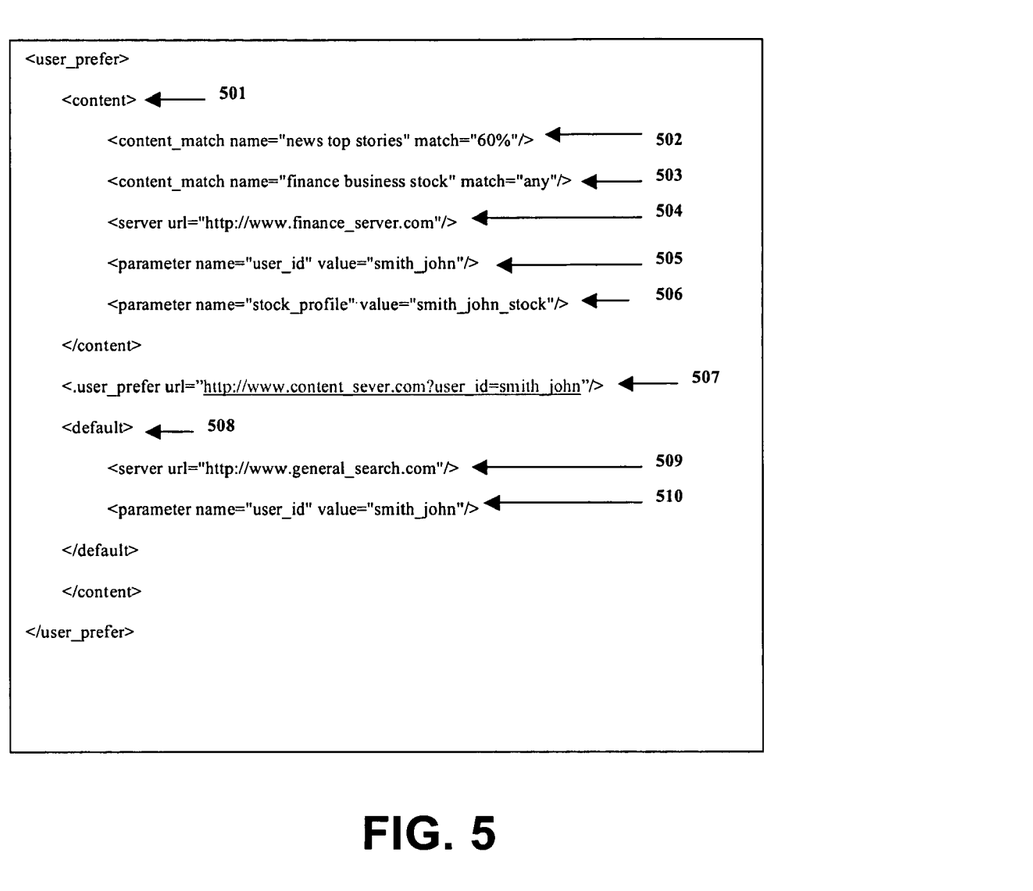
FIG. 5 is an example User Prefer Markup Language file.

FIG. 5 gives a user-preferred markup language example. Line 501 indicates the beginning of the content which the user has preference. Line 502 indicates the content name, which is "news top stories". The next parameter is the matching qualification threshold. The M2L player will load this file during initialization. When the M2L player processes a M2L file and hits a "time_object" which has "user_perfer" action, it will use the keyword in the "content_info" field of the "time_object" to match the "name" parameter of "content_match" file. For example, if the keyword of "content_info" is "top stories", we get 66% matching which is above the threshold 60% and we find a hit. Line 503 shows another "content_match" parameter and its matching qualification threshold. In this case, the matching content is "finance business stock", and any of these three words shows up, we get a match. Line 504 indicates the action server which the M2L player should contact after it has a match. Line 505 and 506 give M2L player parameters when it needs to contact the action server. The M2L player will send a request to the action server with the keyword information inside the original M2L "time_object", along with the "content_match" information and the information of the parameter fields. The action server will analyze the request and send back a new M2L file to the M2L player. The M2L player will add a new iconic display and tell the user that his preferred information is coming. If the user selects the new icon, the M2L player starts to play the multimedia contents inside the user preferred M2L file. Line 507 tells the M2L player that if it can not find a match content, there is other user preference match server that it needs to visit. Line 508, 509 and 510 tells the M2L player that if all the matching effort failed, it will visit a default search engine to find a match.

With the help of M2L file and user-preferred markup language file, the M2L player can offer lots of amazing information during it plays the main multimedia content. For example, the user wants the M2L player displays the performance of his personal stock portfolio whenever the M2L player displays "business news". What the user can do is to go to a finance service website, register and set up his stock portfolio. Then the user changes his user-preferred markup language file and adds the finance service website and proper match content name and parameters. Next time, the M2L player plays a multimedia content, and hits a "time_object" which has "business news" keyword; it will contact the finance server with the user information. The finance server will send back a new M2L which its multimedia content is the user's stock portfolio and its performance. The M2L player will play this new M2L along with the main multimedia content. In another example, the user wants the M2L player displays real time local traffic during it displays news. In this case, the user needs to go to real time traffic server website, registers and sets his local zip code, or gives a street he is interested. Then the user needs to edit his user-preferred markup language and adds the real time traffic server and proper match content name and parameters. Next time, the M2L player plays news, and hits a "time_object" which has "news" keyword; it will contact the real time traffic server with the user information. The real time traffic server will send back a new M2L which its multimedia content is the local traffic stream that the user is interested.

The core of the M2L player is the Multimedia Markup Language Engine (M2L Engine). FIG. 6 to FIG. 9 discloses the program flow charts of the M2L Engine. Here we only demonstrate one implementation. It will be apparent to one skilled in the art, however, that the M2L Engine can be implemented in other ways.

Figure 6:
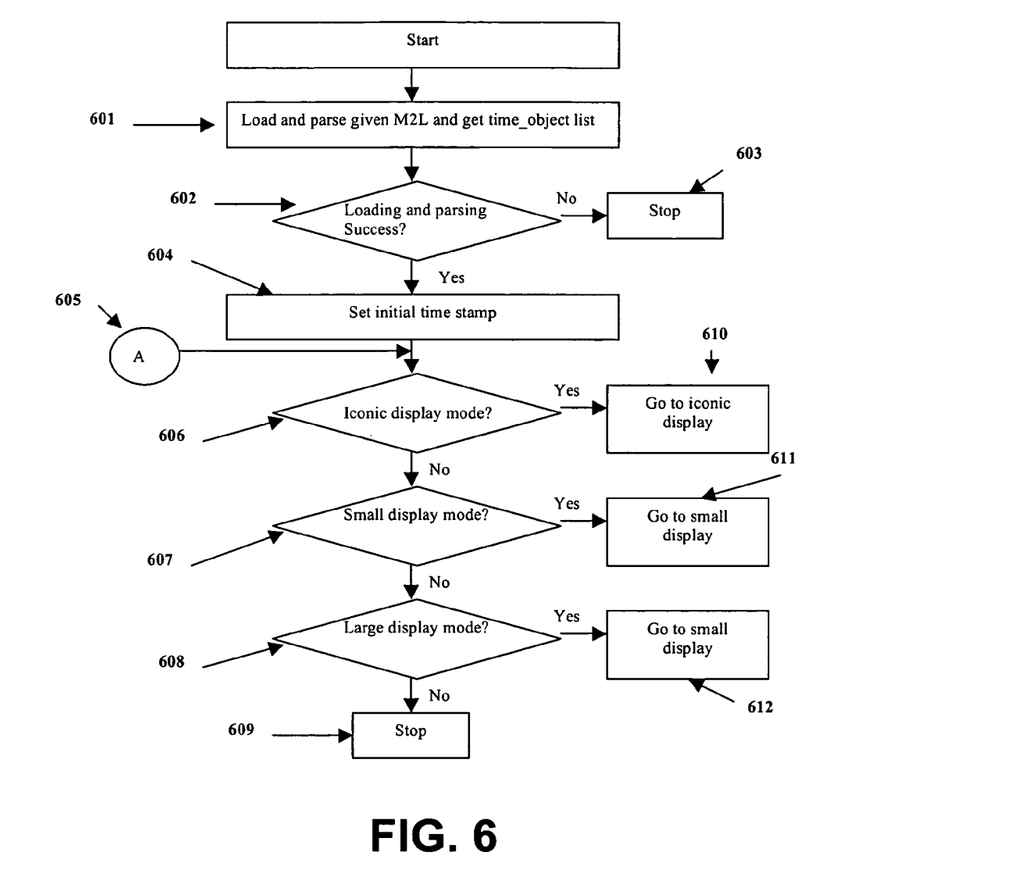
FIG. 6 is the main program flow chat of Multimedia Markup Language Engine.

FIG. 6 shows the main flow chart. When the M2L Engine gets an URL of a M2L file, it will load and parse the given M2L file and generate a "time_object" list (601). If the loading and parsing (602) failed, the M2L Engine will stop the process (603). If the loading and parsing succeed, the M2L Engine will set the initial time stamp (604). Then the M2L Engine will process the M2L according to its display mode. If the M2L display mode is iconic (606), then the M2L Engine will go to iconic display process (610 and FIG. 7). If the M2L display mode is small (607), then the M2L Engine will go to small display process (611 and FIG. 8). If the M2L display mode is large (608), then the M2L Engine will go to large display process (612 and FIG. 9). Otherwise, the M2L Engine will stop the process (609).

Figure 7:
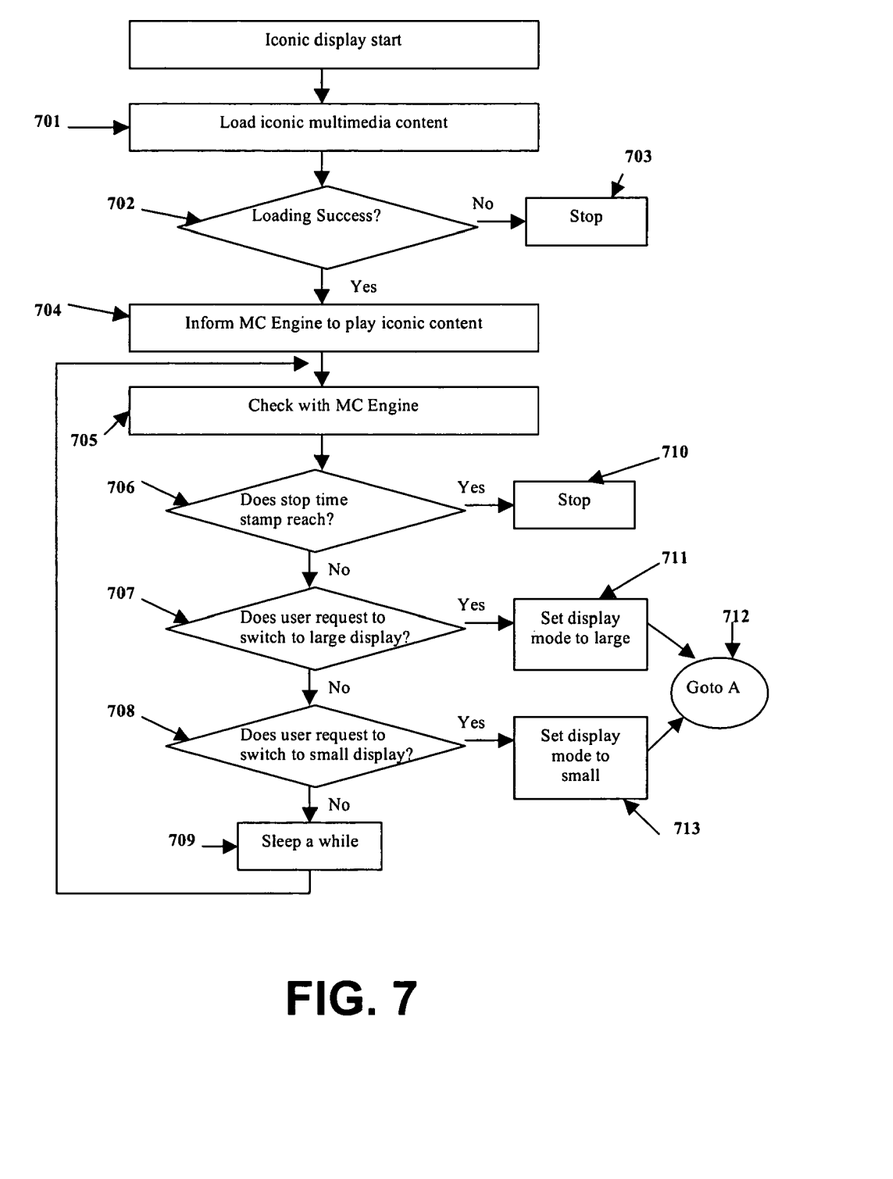
FIG. 7 is the iconic display program flow chat of Multimedia Markup Language Engine.

FIG. 7 shows the flow chart of how to process the M2L in iconic display mode. The M2L Engine loads the iconic multimedia content (701). If the loading (702) failed, the M2L Engine stops the process (703). If the loading succeeds, the M2L Engine will inform the Multimedia Content Engine (MC Engine) to play the iconic content (704). Then the M2L Engine will constantly check with the MC Engine (705). If the stop time stamp for this M2L file reached (706), then the M2L Engine will stop the process (710). Otherwise the M2L Engine will check if the user requests to switch to large display mode (707). If the answer is yes, then the M2L Engine will set the display mode to "Large" (711) and go to entry point "A" at FIG. 6 (712). Otherwise, the M2L Engine will check if the user requests to switch to small display. If the answer is yes, then the M2L Engine will set the display mode to "Small" (713) and go to entry point "A" at FIG. 6 (712). Then the M2L sleeps a while (709) and go back to check with MC Engine again (705).

Figure 8:
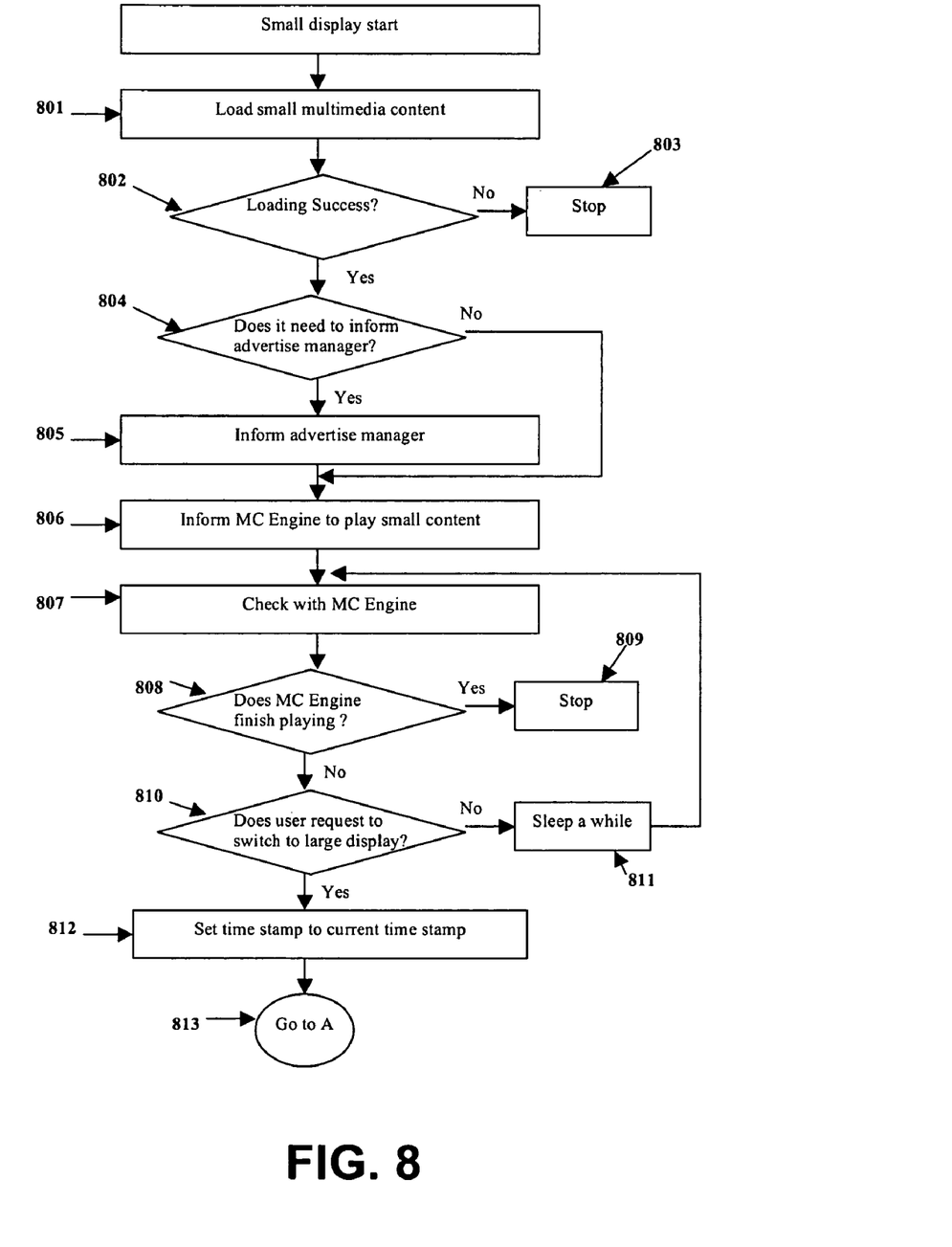
FIG. 8 is the small display program flow chat of Multimedia Markup Language Engine.

FIG. 8 shows the flow chart of how to process the M2L in small display mode. The M2L Engine loads the small multimedia content (801). If the loading (802) failed, the M2L Engine stops the process (803). If the loading succeeds, the M2L Engine will check if it needs to inform the advertise management server (804). If the answer is yes, the M2L Engine will inform the advertise management server (805). If the answer is no, the M2L Engine will skip this process. Then the M2L Engine will inform the MC Engine to play the small multimedia content. The M2L Engine will constantly check with the MC Engine (807). If the MC Engine finishes the playing (808), the M2L Engine will stop the process (809). Otherwise, the M2L Player will check if the user requests to switch to large display (810). If the answer is yes, then the M2L Player will set the time stamp to the current time stamp (812) and go to entry point "A" in FIG. 6. Otherwise, the M2L Engine will sleep a while (811) and go back to check with MC Engine again (807).

Figure 9:
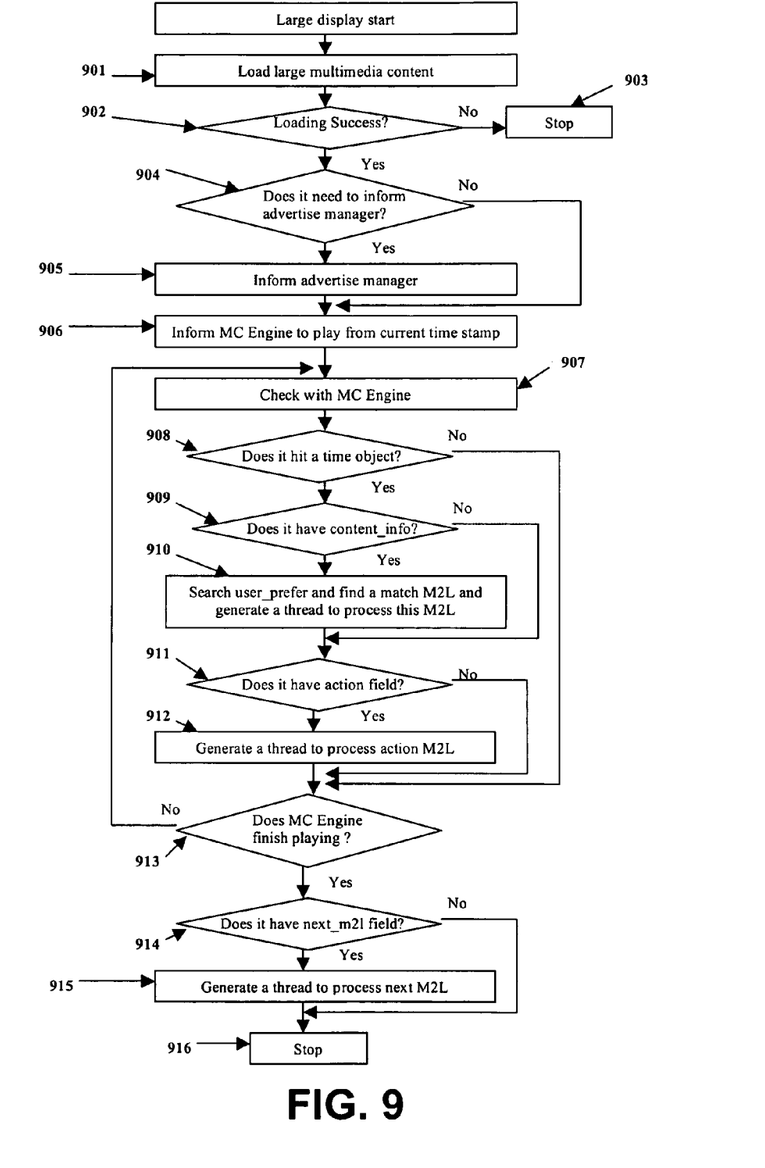
FIG. 9 is the large display program flow chat of Multimedia Markup Language Engine.

FIG. 9 shows the flow chart of how to process the M2L in large display mode. The M2L Engine loads the large multimedia content (901). If the loading (902) failed, the M2L Engine stops the process (903). If the loading succeeds, the M2L Engine will check if it needs to inform the advertise management server (904). If the answer is yes, the M2L Engine will inform the advertise management server (905). If the answer is no, the M2L Engine will skip this process. Then the M2L Engine will inform the MC Engine to play the large multimedia content from the current time stamp. The M2L Engine will constantly check with the MC Engine (907). If the M2L Engine does not hit a time object (908), it directly checks with MC Engine to find out if it finishes the play (913). If the M2L Engine does hit a time object, it will check if the "time_object" has the "content_info" field (909). If the answer is yes, the M2L Engine will search the "user_prefer" field and find a matched action M2L file, then generates a new thread to process the new M2L file (910). If the "time_object" has action field (911), the M2L Engine will generate a new thread to process the action M2L file. Then the M2L Engine checks with the MC Engine to find out if it finishes playing the large multimedia content (913). If the answer is no, then it goes back to check the MC Engine again (907). Otherwise, the M2L Engine will check if the given M2L has "next_m2l" field (914). If the answer is yes, the M2L Engine will generate a new thread to process the new M2L. Otherwise, the M2L Engine will stop the process (916).

To avoid the delay caused by the network and the server process time, the M2L Engine can pre-load and process the "time_object" ahead of the Multimedia Content Engine (MC Engine). When the MC Engine hits the "time_object", its content can be played immediately without any delay.

The start time stamp and stop time stamp shown in FIG. 4 are marked by playing time. For a frame-based multimedia content, the frame number can also be used to mark the start time stamp and stop time stamp.

In order to help the user to browse through the time-based multimedia content, all the iconic-displayed multimedia content will form a first-in-first-out queue. The user can browse forward or backward through this queue while viewing the big display multimedia content.

As many apparently different embodiments of this invention may be made without departing from the spirit and scope thereof, it is to be understood that the invention is not limited to the specific embodiments thereof except as defined in the appended claims.

What is claimed is:

1. A method of displaying multimedia content on a video screen for a viewer, the method comprising:
    receiving a video stream and a markup language segment associated with the video stream, the markup language segment received from a provider, the markup language segment comprising:
        a time stamp identifying a target segment of the video stream; and
        at least one predetermined keyword configured by the provider, wherein the predetermined keyword is associated with the time stamp;
    automatically transmitting the predetermined keyword over a network to a search engine independent of user input;
    receiving related content from the search engine over the network, wherein the related content is related to the predetermined keyword; and
    while the target segment of the video stream is displayed on the video screen, concurrently displaying the related content on the video screen for the viewer, wherein the viewer is unaware of the predetermined keyword.

2. The method as recited in claim 1, wherein the markup language segment further comprises a pointer to a next markup language segment to process.

3. The method as recited in claim 1, wherein the time stamp comprises an offset from the start of the video stream to the beginning of the target segment.

4. The method as recited in claim 1, wherein the time stamp comprises a duration of the target segment.

5. The method as recited in claim 1, wherein the related content comprises advertising content.

6. The method as recited in claim 1, wherein the related content comprises news content.

7. The method as recited in claim 1, wherein the search engine performs a search of substantially the entire Internet based on the keyword to locate the related content.

8. The method as recited in claim 1, wherein the video stream and markup language segment are received over a network.

9. The method as recited in claim 1, wherein at least one of the video stream and the markup language segment are received from a local storage device.

10. The method as recited in claim 1, wherein the video stream is received over a first channel, and the markup language segment is received over a second channel.

11. The method as recited in claim 1, wherein the video stream is received over a first channel, and the markup language segment is received over the first channel.

12. A method of displaying multimedia content on a video screen for a viewer, the method comprising:
   receiving a video stream and a markup language segment associated with the video stream, the markup language segment received from a provider, the markup language segment comprising:
      a time stamp identifying a target segment of the video stream; and
      at least one predetermined keyword configured by the provider, wherein the predetermined keyword is associated with the time stamp;
   comparing the predetermined keyword to a user preference file;
   when there is a match between the predetermined keyword and the user preference file, automatically transmitting a content identifier over a network to a first server independent of user input;
   receiving related content from the first server over the network, wherein the related content is related to the content identifier; and
   while the target segment of the video stream is displayed on the video screen, concurrently displaying the related content on the video screen for the viewer,
   wherein the viewer is unaware of the predetermined keyword.

13. The method as recited in claim 12, wherein the markup language segment further comprises a pointer to a next markup language segment to process.

14. The method as recited in claim 12, further comprising a user editing a matching criteria in the user preference file.

15. The method as recited in claim 12, wherein the user preference file specifies a website to locate the related content associated with the match.

16. The method as recited in claim 12, further comprising receiving the user preference file from a second server over the network.

17. The method as recited in claim 12, further comprising receiving the user preference file from a local storage device.

18. A multimedia player for displaying multimedia content on a video screen for a viewer, the multimedia player comprising an engine for:
   receiving a video stream and a markup language segment associated with the video stream, the markup language segment received from a provider, the markup language segment comprising:
      a time stamp identifying a target segment of the video stream; and
      at least one predetermined keyword configured by the provider, wherein the predetermined keyword is associated with the time stamp;
   automatically transmitting the predetermined keyword over a network to a search engine independent of user input;
   receiving related content from the search engine over the network, wherein the related content is related to the predetermined keyword; and
   while the target segment of the video stream is displayed on the video screen, concurrently displaying the related content on the video screen for the viewer,
   wherein the viewer is unaware of the predetermined keyword.

19. The multimedia player as recited in claim 18, wherein the markup language segment further comprises a pointer to a next markup language segment to process.

20. The multimedia player as recited in claim 18, wherein the time stamp comprises an offset from the start of the video stream to the beginning of the target segment.

21. The multimedia player as recited in claim 18, wherein the time stamp comprises a duration of the target segment.

22. The multimedia player as recited in claim 18, wherein the related content comprises advertising content.

23. The multimedia player as recited in claim 18, wherein the related content comprises news content.

24. The multimedia player as recited in claim 18, wherein the search engine performs a search of substantially the entire Internet based on the keyword to locate the related content.

25. The multimedia player as recited in claim 18, wherein the control circuitry receives the video stream and markup language segment over a network.

26. The multimedia player as recited in claim 18, wherein the control circuitry receives at least one of the video stream and the markup language segment from a local storage device.

27. The multimedia player as recited in claim 18, wherein the control circuitry receives the video stream over a first channel, and receives the markup language segment over a second channel.

28. The multimedia player as recited in claim 18, wherein the control circuitry receives the video stream over a first channel, and receives the markup language segment over the first channel.

29. A multimedia player for displaying multimedia content on a video screen for a viewer, the multimedia player comprising an engine for:
   receiving a video stream and a markup language segment associated with the video stream, the markup language segment received from a provider, the markup language segment comprising:
      a time stamp identifying a target segment of the video stream; and
      at least one predetermined keyword configured by the provider, wherein the predetermined keyword is associated with the time stamp;
   comparing the predetermined keyword to a user preference file;

when there is a match between the predetermined keyword and the user preference file, automatically transmitting a content identifier over a network to a first server independent of user input;

receiving related content from the first server over the network, wherein the related content is related to the content identifier; and while the target segment of the video stream is displayed on the video screen, concurrently displaying the related content on the video screen for the viewer, wherein the viewer is unaware of the predetermined keyword.

30. The multimedia player as recited in claim 29, wherein the markup language segment further comprises a pointer to a next markup language segment to process.

31. The multimedia player as recited in claim 29, wherein the control circuitry comprises an interface for a user to edit a matching criteria in the user preference file.

32. The multimedia player as recited in claim 29, wherein the user preference file specifies a website to locate the related content associated with the match.

33. The multimedia player as recited in claim 29, wherein the control circuitry receives the user preference file from a second server over the network.

34. The multimedia player as recited in claim 29, wherein the control circuitry receives the user preference file from a local storage device.

35. A non-transitory computer readable storage medium comprising code segments for:

receiving a video stream and a markup language segment associated with the video stream, the markup language segment received from a provider, the markup language segment comprising:
a time stamp identifying a target segment of the video stream; and
at least one predetermined keyword configured by the provider, wherein the predetermined keyword is associated with the time stamp;

automatically transmitting the predetermined keyword over a network to a search engine independent of user input;

receiving related content from the search engine over the network, wherein the related content is related to the predetermined keyword; and while the target segment of the video stream is displayed on the video screen, concurrently displaying the related content on the video screen for a viewer, wherein the viewer is unaware of the predetermined keyword.

36. The non-transitory computer readable storage medium as recited in claim 35, wherein the markup language segment further comprises a pointer to a next markup language segment to process.

37. The non-transitory computer readable storage medium as recited in claim 35, wherein the time stamp comprises an offset from the start of the video stream to the beginning of the target segment.

38. The non-transitory computer readable storage medium as recited in claim 35, wherein the time stamp comprises a duration of the target segment.

39. The non-transitory computer readable storage medium as recited in claim 35, wherein the related content comprises advertising content.

40. The non-transitory computer readable storage medium as recited in claim 35, wherein the related content comprises news content.

41. The non-transitory computer readable storage medium as recited in claim 35, wherein the search engine performs a search of substantially the entire Internet based on the keyword to locate the related content.

42. The non-transitory computer readable storage medium as recited in claim 35, wherein the video stream and markup language segment are received over a network.

43. The non-transitory computer readable storage medium as recited in claim 35, wherein at least one of the video stream and the markup language segment are received from a local storage device.

44. The non-transitory computer readable storage medium as recited in claim 35, wherein the video stream is received over a first channel, and the markup language segment is received over a second channel.

45. The non-transitory computer readable storage medium as recited in claim 35, wherein the video stream is received over a first channel, and the markup language segment is received over the first channel.

46. A non-transitory computer readable storage medium comprising code segments for:

receiving a video stream and a markup language segment associated with the video stream, the markup language segment received from a provider, the markup language segment comprising:
a time stamp identifying a target segment of the video stream; and
at least one predetermined keyword configured by the provider, wherein the predetermined keyword is associated with the time stamp;

comparing the predetermined keyword to a user preference file;

when there is a match between the predetermined keyword and the user preference file, automatically transmitting a content identifier over a network to a first server independent of user input;

receiving related content from the first server over the network, wherein the related content is related to the content identifier; and while the target segment of the video stream is displayed on the video screen, concurrently displaying the related content on the video screen for a viewer, wherein the viewer is unaware of the predetermined keyword.

47. The non-transitory computer readable storage medium as recited in claim 46, wherein the markup language segment further comprises a pointer to a next markup language segment to process.

48. The non-transitory computer readable storage medium as recited in claim 46, further comprising code segments for a user editing a matching criteria in the user preference file.

49. The non-transitory computer readable storage medium as recited in claim 46, wherein the user preference file specifies a website to locate the related content associated with the match.

50. The non-transitory computer readable storage medium as recited in claim 46, further comprising code segments for receiving the user preference file from a second server over the network.

51. The non-transitory computer readable storage medium as recited in claim 46, further comprising code segments for receiving the user preference file from a local storage device.

* * * * *